United States Patent [19]
Loppnow

[11] Patent Number: 6,149,377
[45] Date of Patent: Nov. 21, 2000

[54] CONVEYOR APPARATUS FOR CONVEYING STACKS OF ARTICLES

[75] Inventor: Eric Loppnow, Greenleaf, Wis.

[73] Assignee: The Hudson-Sharp Machine Co., Green Bay, Wis.

[21] Appl. No.: 09/287,246

[22] Filed: Apr. 7, 1999

[51] Int. Cl.⁷ .................................................. B65G 17/12
[52] U.S. Cl. ........................ 414/790.4; 198/692; 414/900
[58] Field of Search ............................... 198/692; 414/27, 414/790.4, 900.923

[56] References Cited

U.S. PATENT DOCUMENTS

| | | | |
|---|---|---|---|
| 4,252,233 | 2/1981 | Joice | 198/692 |
| 4,741,525 | 5/1988 | Ebmeyer et al. | |
| 5,074,735 | 12/1991 | Stock | 414/27 |
| 5,522,690 | 6/1996 | Pickering | |
| 5,667,468 | 9/1997 | Bandura | 198/692 X |
| 5,738,478 | 4/1998 | Pickering | |
| 5,746,569 | 5/1998 | Smith et al. | 414/790.4 |

*Primary Examiner*—Janice L. Krizek
*Attorney, Agent, or Firm*—Rockey, Milnamow & Katz, Ltd.

[57] ABSTRACT

A conveyor apparatus for stacked articles, such as stacked plastic or paper bags, includes a frame, and a plurality of sprocket assemblies about which one or more conveyor chains extend. The apparatus includes a plurality of wicket wire holding assemblies mounted on the chains at spaced apart intervals for intermittent, incremental movement along a conveyor path defined by the conveyor chains. Each of the holding assemblies includes a pair of support arms, and an adjustment mechanism for adjusting the spacing between the arms. The apparatus includes an arrangement for simultaneously adjusting the spacing between the support arms of all of the holding assemblies, including an adjustment drive chain trained about the sprocket assemblies, and a mechanism for moving the adjustment drive chain relative to the conveyor chains of the apparatus.

10 Claims, 3 Drawing Sheets

CONVEYOR APPARATUS FOR CONVEYING STACKS OF ARTICLES

TECHNICAL FIELD

The present invention relates generally to an apparatus for conveying stacks of articles, such as stacks of bags held on wire wickets, and more particularly to an apparatus including an arrangement for simultaneously and efficiently adjusting the spacing of a pair of support arms on each of a plurality of wicket wire holding assemblies of the apparatus.

BACKGROUND OF THE INVENTION

Plastic bags for packaging products, such as loaf bread, are typically supplied to a packaging operation in stacks retained on wire wickets. Each of the bags is typically provided with a pair of holes, with each wicket including a pair of arms arranged in generally parallel relationship. Stacks of the bags are arranged on the wire wickets such that the arms of the wickets extend through the holes in each bag. In this fashion, stacks of bags can be efficiently handled.

Individual plastic bags are normally manufactured in a configuration which includes the desired spaced holes for receiving an associated wicket therethrough. Apparatus are known which effect stacking of the individual bags, such as on a pair of pins or the like, so that the bags are positioned in alignment with each other for disposition of a wicket through the holes in the bags. U.S. Pat. No. 5,522,690, and U.S. Pat. No. 5,738,478, hereby incorporated by reference, each disclose an arrangement for effecting stacking of bags on a pair of pins, and subsequent placement of a wicket through the aligned holes of the bags.

As will be appreciated, the type of automated machinery for effecting stacking and conveyance of bags, or like articles, having holes for receiving an associated wire wicket, is preferably configured to accommodate bags of varying sizes, including differently spaced holes for receiving the wicket. In some instances, it has been necessary to individually adjust stack-carrying assemblies on a piece of equipment in order to configure the equipment for differently sized bags, with differently spaced holes. The present invention is directed to a conveying-apparatus, such as for conveying stacks of plastic bags, wherein a plurality of wire wicket holding assemblies of the apparatus, each including a pair of support arms, can be simultaneously and efficiently adjusted for handling bags having differently spaced wicket-receiving holes.

SUMMARY OF THE INVENTION

A conveyor apparatus embodying the principles of the present invention is particularly suited for conveying articles such as stacks of bags each having a pair of holes for receiving an associated wire wicket. The present conveying apparatus includes a plurality of wire wicket holding assemblies arranged for movement along a conveyor path, with each of the holding assemblies including a pair of support arms which receive and support an associated wire wicket upon which a stack of bags is placed. Notably, the present apparatus includes an arrangement whereby the spacing between the support arms of each of the holding assemblies can be simultaneously adjusted, thus promoting very efficient conversion of the conveyor apparatus for use with bags or like articles having differently spaced wicket-receiving holes or openings.

In accordance with the illustrated embodiment, the present conveyor apparatus is configured for conveying stacks of articles, in particular, stacks of paper or plastic bags each having a pair of wicket-receiving holes. The apparatus includes a frame, and a plurality of sprocket assemblies mounted in spaced apart relationship on the frame.

At least one conveyor chain extends about the sprocket assemblies defining a conveyor path of the apparatus. A plurality of wicket wire holding assemblies are mounted on the conveyor chain at spaced apart intervals for incremental movement along the conveyor path. Each of the wire holding assemblies includes a pair of support arms, and an adjustment mechanism for adjusting the spacing between each pair of support arms.

In accordance with the present invention, the apparatus includes an adjustment drive for simultaneously operating the adjustment mechanisms of the wire holding assemblies, thereby simultaneously adjusting the spacing between the pair of support arms of each assembly. In this fashion, highly efficient and substantially automatic adjustment of the spacing between the support arms of each wire holding assembly can be effected.

The configuration of the present apparatus is desirably straightforward for economical manufacture and reliable operation. The adjustment mechanism of each holding assembly includes an adjustment drive shaft, and an arm adjustment shaft extending perpendicularly to the adjustment drive shaft. The adjustment mechanism further includes a right-angle drive coupling, preferably comprising a worm and worm gear, so that rotation of the adjustment drive shaft effects rotation of the arm adjustment shaft. The arm adjustment shaft includes oppositely threaded end portions to which the pair of support arms are respectively coupled so that rotation of the arm adjustment shaft alters the spacing between the support arms.

In order to effect simultaneous operation of the adjustment mechanisms of the wicket wire holding assemblies, the present apparatus includes an adjustment drive chain which extends about the sprocket assemblies of the apparatus. One of the sprocket assemblies includes a pair of coaxial shafts, one of which is joined to a sprocket in engagement with the adjustment drive chain, and the other of which is joined to a respective sprocket in engagement with the conveyor drive. An input element in the form of an operating handle is provided for effecting relative rotation of the coaxial shafts, to thereby move the adjustment drive chain relative to the conveyor drive. Each of the adjustment mechanisms of the wire holding assemblies includes a sprocket in engagement with the adjustment drive chain. Thus, relative movement of the adjustment drive chain relative to the conveyor chain effects simultaneous operation of the adjustment mechanisms of the holding assemblies.

Other features and advantages of the present invention will become readily apparent from the following detailed description, the accompanying drawings, and the appended claims.

DETAILED DESCRIPTION

Figure 1:
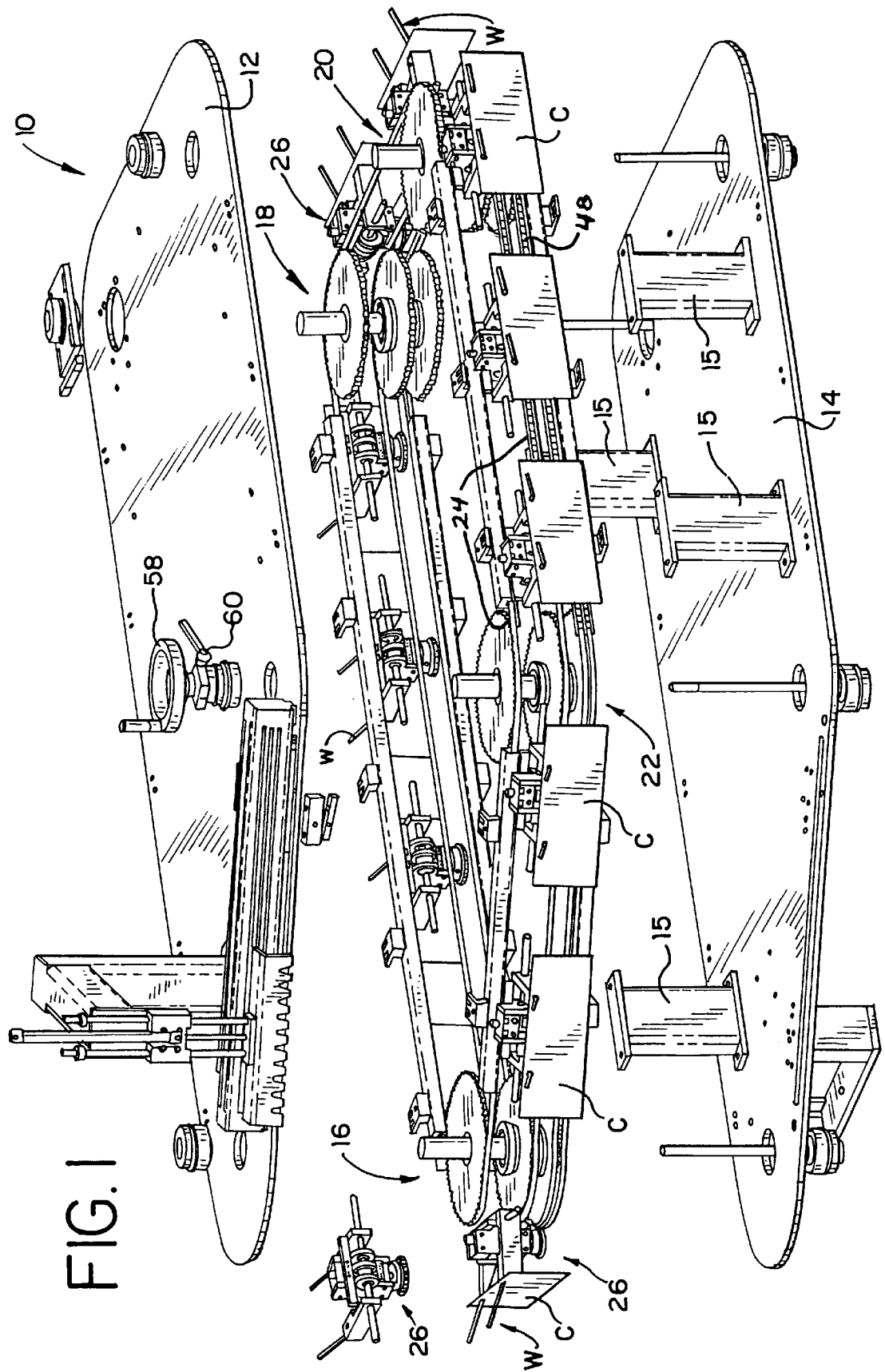
FIG. 1 is a diagrammatic, exploded perspective view of a conveyor apparatus embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference first to FIG. 1, therein is illustrated a diagrammatic, exploded perspective view of a conveyor apparatus 10 embodying the principles of the present invention. The conveyor apparatus 10 is particularly configured for conveying stacks of articles, such as stacks of bags each of which include a pair of holes. The conveyor apparatus 10 is configured to receive and carry a plurality of wicket wires, designated W, which in turn each receive a respective stack of the bags being handled and conveyed by the apparatus. The stacks of bags (not shown) may comprise paper or plastic bags, with the apparatus 10 configured to receive a stack of the bags on each of the wire wickets carried by the apparatus. Typically, a backing card C is mounted on each wire W prior to disposition of a stack of bags on the wicket.

With particular reference to FIG. 1, the conveyor apparatus 10 includes an apparatus frame, comprising upper and lower frames 12 and 14 which are joined to each other by a plurality of frame supports 15 extending therebetween. The apparatus includes a plurality of sprocket assemblies mounted in spaced apart relationship on the apparatus frame, including, in the illustrated embodiment, sprocket assemblies 16, 18, 20, and 22. As will be further described, sprocket assembly 22 is configured to facilitate adjustment of the conveyor apparatus.

The conveyor apparatus 10 includes at least one conveyor chain 24, with two conveyor chains 24 being provided in the illustrated embodiment. Conveyor chains 24 are arranged in vertically spaced relationship, and are trained and extend about the sprocket assemblies of the apparatus to define the conveyor path of the apparatus.

In order to receive stacks of bags or other articles for conveyance, the apparatus 10 includes a plurality of wicket wire holding assemblies 26 mounted on the conveyor chains 24 at spaced apart intervals for movement along the conveyor path. Incremental, driven movement of the conveyor chains is effected to advance the holding assemblies 26. Each of the holding assemblies 26 is configured to receive a generally U-shaped wire wicket W thereon, and an associated backing card C prior to disposition of a stack of articles on the wicket.

Figure 2:
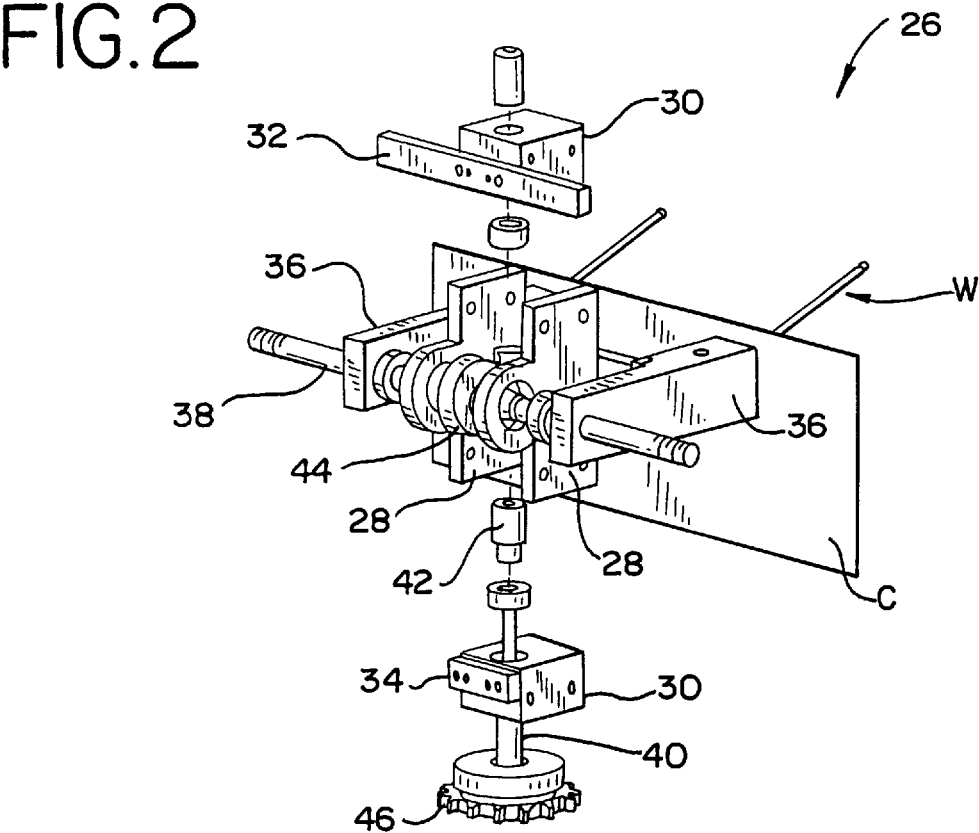
FIG. 2 is a diagrammatic, exploded perspective view of a wicket wire holding assembly of the present apparatus.
Figure 3:
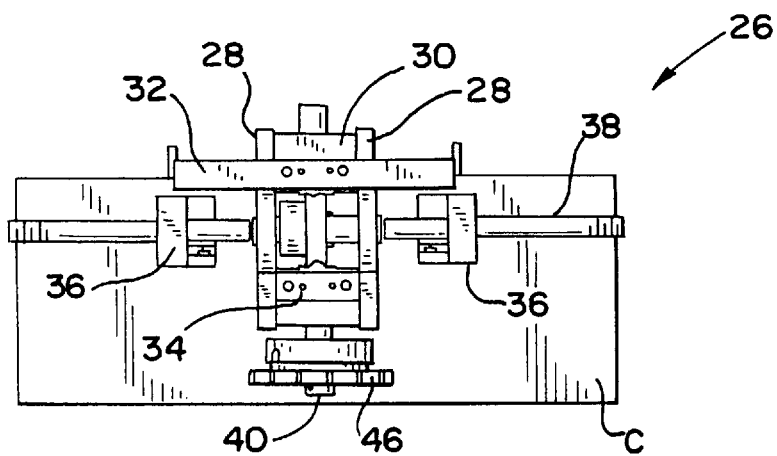
FIG. 3 is a rear elevational view of the holding assembly illustrated in FIG. 2.

With particular reference to FIGS. 2 and 3, each of the holding assemblies 26 includes a pair of plates 28 and a pair of blocks 30 positioned between the plates 28, as shown in FIG. 3. An upper chain mount 32 and a lower chain mount 34 are provided for securement of each holding assembly to the associated conveyor chains 24.

In order to support a wire wicket and associated stacked articles, each holding assembly 26 includes a pair of spaced apart support arms 36 which extend generally outwardly of the conveyor apparatus 10. As will be appreciated, the spacing between the support arms 36 is selected in accordance with the size of the wicket wire W to be received on the support arms, and thus, adjustment of the spacing between the support arms is desirable if the apparatus 10 is to be used for differently sized wickets and stacked articles.

To this end, the present apparatus includes an adjustment arrangement which facilitates efficient and simultaneous adjustment of the spacing between the support arms of all of the holding assemblies 26 of the apparatus 10.

Each of the holding assemblies 26 includes an adjustment mechanism for adjusting the spacing between the support arms 36 thereof. The adjustment mechanism includes generally horizontally oriented arm adjustment shaft 38 having oppositely threaded end portions to which the pair of support arms 36 are respectively coupled in threaded engagement. Each adjustment mechanism further includes an adjustment drive shaft 40, arranged in perpendicular relationship to the arm adjustment shaft 38. A right-angle drive coupling operatively connects each drive shaft 40 with the respective arm adjustment shaft 38. In the illustrated embodiment, the right-angle drive coupling comprises a worm 42 mounted for rotation on adjustment drive shaft 40, and a work gear 44 mounted on arm adjustment shaft 38, in meshing engagement with worm 42. An adjustment sprocket 46 is mounted on the adjustment drive shaft 40 for effecting operation of the adjustment mechanism, as will be described.

Operation of the adjustment mechanisms is effected by the provision of an adjustment drive chain 48 which extends about the sprocket assemblies of the apparatus in parallel relationship to the conveyor chains 24. Adjustment of the support arm spacing is effected by an arrangement which moves the adjustment drive chain relative to the conveyor chains 24 about the sprocket assemblies.

Figure 4:
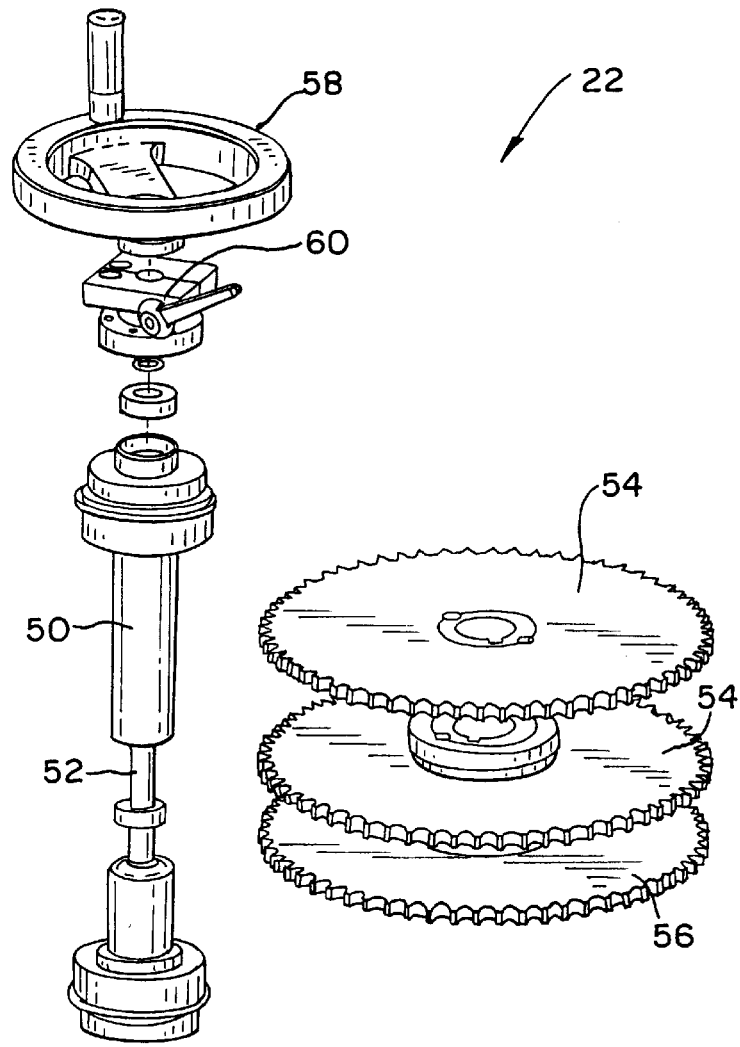
FIG. 4 is a diagrammatic, exploded perspective view of a sprocket assembly of the present apparatus configured for effecting adjustment.
Figure 5:
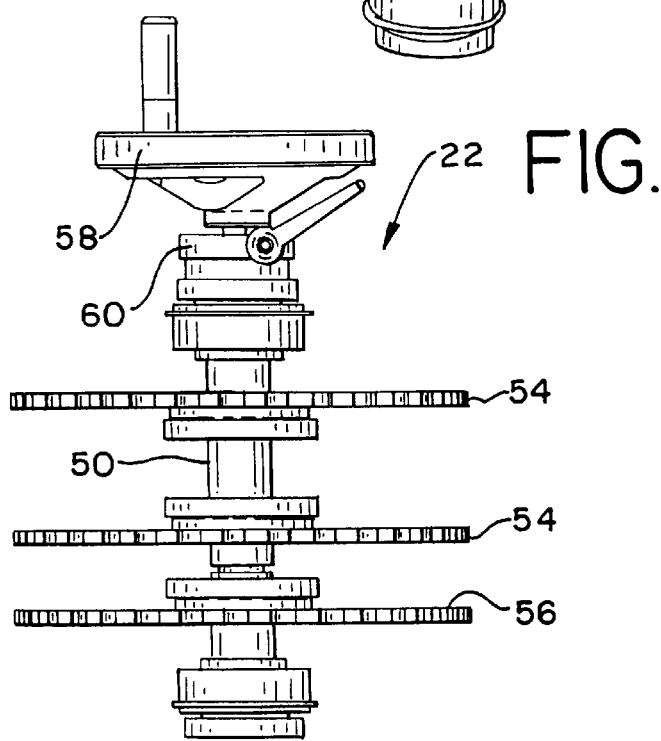
FIG. 5 is a side elevational view of the sprocket assembly as shown in FIG. 4.

Each of the sprocket assemblies includes at least one conveyor chain sprocket in respective engagement with the conveyor chains 24, with two such sprockets being provided on each of the sprocket assemblies in the illustrated embodiment. Each of the sprocket assemblies further includes an adjustment sprocket in engagement with the adjustment drive chain 48. Adjustment of the apparatus is achieved by providing sprocket assembly 22 with a pair of coaxial shafts, one of which is joined to a respective sprocket in engagement with the adjustment drive chain 48, and the other of which is joined to respective sprockets in engagement with conveyor chains 24. As illustrated in FIGS. 4 and 5, the adjustable sprocket assembly 22 of the present apparatus includes an outer shaft 50 arranged in coaxial relationship with an inner shaft 52. A pair of conveyor chain sprockets 54 are mounted on the outer shaft 52 for rotation therewith, with each of the sprockets 54 being configured for respective engagement with the conveyor chains 24.

Apparatus adjustment is achieved by the provision of an adjustment drive sprocket 56 fixed to inner shaft 52, with the sprocket 56 being in engagement with adjustment drive chain 48. An adjustment handle 58 is connected to the inner shaft 52 for effecting rotation of the inner shaft, and thus adjustment drive sprocket 56, relative to drive sprockets 54. A suitable drive motor can be optionally provided for effecting relative rotation of the inner and outer shaft. In this manner, adjustment drive chain 48 can be moved relative to the conveyor chains 24. By such relative movement, engagement of adjustment chain 48 with the adjustment sprocket 56 of the adjustment mechanism of each holding assembly 26 effects simultaneous operation of the adjustment mechanisms and thus, simultaneous adjustment of the spacing between the support arms 36 of each holding assembly A selectively engageable shaft lock 60, comprising a lockable collar, is mounted on outer shaft 50, and is operable to lock the outer shaft 50 and the inner shaft 52 against relative rotation.

From the foregoing, operation of the adjustment arrangement for the present conveyor apparatus will be readily appreciated. Disengagement of shaft lock 60 permits inner shaft 52 to be rotated relative to outer shaft 50 by rotation of adjustment handle 58. By this action, sprocket 56 joined to the inner shaft 52 is rotated relative to sprockets 54 fixed to outer shaft 50. This action effects movement of adjustment drive chain 48 relative to conveyor chains 24. As will be appreciated, each of the sprocket assemblies of the apparatus includes a sprocket in engagement with the adjustment drive chain 48 which can rotate relative to the associated sprockets about which the conveyor chains 24 are trained.

Movement of adjustment drive chain 48 relative to the conveyor chains 24 acts through sprocket 56 of each adjustment mechanism of each holding assembly 26. Adjustment drive shaft 40 of each adjustment mechanism is thus rotated, whereby worm 42 effects driven rotation of the associated worm gear 44. Rotation of arm adjustment shaft 38 is thus effected, with the oppositely threaded end portions of the shaft to which support arms 36 are coupled effecting movement of the support arms toward or away from each other. After the selected spacing has been achieved, with adjustment taking place simultaneously for all of the holding assemblies of the apparatus, the shaft lock 60 on sprocket assembly 22 can be tightened to fix outer shaft 50 and inner shaft 52 against relative rotation. The conveyor apparatus can then again be operated in a normal fashion, with intermittent movement of the conveyor effected for conveyance of stacked articles received on the wicket wires being held by each holding assembly 26.

From the foregoing, it will be observed that numerous modifications and variations can be effected without departing from the spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A conveyor apparatus for conveying stacks of articles, comprising:

an apparatus frame;

a plurality of sprocket assemblies mounted in spaced apart relationship on said frame;

at least one conveyor chain extending about said sprocket assemblies to define a conveyor path of said apparatus;

a plurality of wicket wire holding assemblies mounted on said conveyor chain at spaced apart intervals for movement along said conveyor path, each of said wire holding assemblies including a pair of support arms, and an adjustment mechanism for adjusting the spacing between each pair of support arms; and an adjustment drive for simultaneously operating said adjustment mechanisms to simultaneously adjust the spacing between the pair of support arms of said wire holding assemblies.

2. A conveyor apparatus in accordance with claim 1, wherein said adjustment drive comprises an adjustment drive chain extending about said sprocket assemblies in parallel relationship to said conveyor chain, and adjustment means for moving said adjustment drive chain relative to said conveyor chain about said sprocket assemblies.

3. A conveyor apparatus in accordance with claim 2, wherein each of said sprocket assemblies includes at least one conveyor chain sprocket in respective engagement with said conveyor chain, and an adjustment sprocket in engagement with said adjustment drive chain, said adjustment means comprises means on one of said sprocket assemblies for moving said adjustment sprocket relative to said conveyor chain sprocket and for thereafter locking the sprockets against relative movement.

4. A conveyor apparatus in accordance with claim 2, wherein said adjustment mechanism of each said wicket wire holding assembly includes an adjustment drive shaft coupled to said adjustment drive chain, an arm adjustment shaft extending perpendicularly to said adjustment drive shaft, and a right-angle drive coupling said shafts so that rotation of said adjustment drive shaft effects rotation of said arm adjustment shaft.

5. A conveyor apparatus in accordance with claim 4, wherein said arm adjustment shaft of each said adjustment mechanism includes oppositely threaded end portions to which said pair of support arms are respectively coupled, so that rotation of said arm adjustment shaft alters the spacing between the support arms.

6. A conveyor apparatus for conveying stacks of bags held on wicket wires, comprising:

an apparatus frame;

a plurality of sprocket assemblies mounted in spaced apart relationship on said frame;

at least one conveyor chain extending about said sprocket assemblies to define a conveyor path of said apparatus;

a plurality of wicket wire holding assemblies mounted on said conveyor chain at spaced apart intervals for movement along said conveyor path, each of said wire holding assemblies including a pair of support arms for holding a wicket wire for receiving a stack of bags thereon, and an adjustment mechanism for adjusting the spacing between each pair of support arms; and an adjustment drive for simultaneously operating said adjustment mechanisms, said adjustment drive comprising an adjustment drive chain extending about said sprocket assemblies, one of said sprocket assemblies including a pair of coaxial shafts, one of said coaxial shafts being joined to a respective sprocket in engagement with said adjustment drive chain, and the other of said coaxial shafts being joined to a respective sprocket in engagement with said conveyor chain, said adjustment drive including an input element for rotating said one of said coaxial shafts relative to the other, to move said adjustment drive chain relative to said conveyor chain.

7. A conveyor apparatus in accordance with claim 6, wherein said adjustment drive includes a shaft lock for locking said coaxial shafts against relative rotation.

8. A conveyor apparatus in accordance with claim 6, wherein each of said adjustment mechanisms includes an adjustment drive shaft having a sprocket mounted thereon in engagement with said adjustment drive chain, and an arm adjustment shaft operatively coupled to said adjustment drive shaft and said pair of support arms.

9. A conveyor apparatus in accordance with claim 8, wherein each of said adjustment mechanisms further includes a right-angle drive coupling operatively coupling said adjustment drive shaft to the respective arm adjustment shaft, said arm adjustment shaft including oppositely threaded end portions to which respective ones of the pair of support arms are respectively coupled.

10. A conveyor apparatus in accordance with claim 9, wherein said right-angle drive coupling includes a worm mounted on said adjustment drive shaft, and a worm gear mounted on said arm adjustment shaft in driven engagement with said worm.

\* \* \* \* \*